United States Patent
Chan

(10) Patent No.: US 8,757,311 B2
(45) Date of Patent: Jun. 24, 2014

(54) MOTORIZED DRIVING DEVICE

(76) Inventor: Yet Chan, Kowloon (HK)

( * ) Notice: Subject to any disclaimer, the term of this patent is extended or adjusted under 35 U.S.C. 154(b) by 0 days.

(21) Appl. No.: 13/157,688

(22) Filed: Jun. 10, 2011

(65) Prior Publication Data

US 2012/0312618 A1 Dec. 13, 2012

(51) Int. Cl.
*B62M 6/55* (2010.01)

(52) U.S. Cl.
USPC .................. 180/206.4; 180/206.1; 180/205.2; 180/205.4

(58) Field of Classification Search
USPC ...................... 180/206.4, 206.1, 205.2, 205.4
See application file for complete search history.

(56) References Cited

U.S. PATENT DOCUMENTS

| 6,629,574 | B2 * | 10/2003 | Turner | 180/206.4 |
| 6,880,661 | B1 * | 4/2005 | Oh | 180/206.1 |
| 6,976,551 | B2 * | 12/2005 | Spanski | 180/206.2 |
| 2010/0206652 | A1 * | 8/2010 | Kielland | 180/220 |

* cited by examiner

*Primary Examiner* — Joseph M Rocca
*Assistant Examiner* — Marlon Arce
(74) *Attorney, Agent, or Firm* — Renner Kenner; Greive Bobak; Taylor & Weber

(57) ABSTRACT

The present invention discloses a motorized driving device for mounting on a frame of a bicycle. The bicycle includes a pedal drive mechanism coupled to a chain for transferring a drive force to at least one chainwheel. The drive device includes a power source of rotary power and a power transmission mechanism for coupling between the pedal drive mechanism and the chain. The power transmission mechanism further includes a first unidirectional power transmission module and a second unidirectional power transmission module, such that an auxiliary power transmitted by the power transmission mechanism from the power source to the chain is independent from an pedal power transmitted by the power transmission mechanism from the pedal drive mechanism to the chain. A method of installing a motorized driving device on a standard bicycle is also disclosed. The motorized driving device in the present invention is suitable for installing on the frame of any ordinary bicycle, without having to alter the frame structure of the bicycle.

24 Claims, 12 Drawing Sheets

MOTORIZED DRIVING DEVICE

FIELD OF INVENTION

This invention relates to a motorized driving device for providing an auxiliary driving force to light vehicles such as bicycles to reduce a workload of a person, such as reducing a need for a person to apply leg power to bicycle pedals, and particularly to a bicycle driving device attachable to a standard bicycle without altering the frame structure of the bicycle.

BACKGROUND OF INVENTION

It has been more and more popular for people to use electrically motorized bicycles for commuting, which typically uses an electric motor to assist manpower. Such an electric bicycle seeks to reduce a workload required of a person by providing a bicycle with an electric motor, a battery for supplying the motor with power, and a prescribed motor auxiliary power in accordance with a control command from the bicycle rider. The motor auxiliary power is particularly useful for bicycle travelling of long-distance and/or long-duration, and travelling over undulating terrain.

Nonetheless, known motorized driving devices for bicycles and their installation may require extensive modification of the frame structure of the bicycle in order to mount the motor, battery and controls to the bicycle. The modifications required range from a radical redesign of the frame and transmission, to a large and ungainly addition to the front, rear wheel or some other part of the bicycle frame. The vast majority of these known mechanisms are not particularly useful or convenient for modifying an existing bicycle, such as those manufactured and sold by traditional bicycle vendors.

SUMMARY OF INVENTION

In the light of the foregoing background, it is an object of the present invention to obviate or mitigate to some degree one or more problems associated with known motorized driving devices for light vehicles such as bicycles.

The above object is met by the combination of features of the main claim; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

Accordingly, the present invention, in one aspect is a motorized driving device for mounting on a frame of a bicycle. The bicycle includes a pedal drive mechanism coupled to a chain for transferring a drive force to at least one chainwheel. The motorized drive device includes a power source of rotary power and a power transmission mechanism for coupling between the pedal drive mechanism and the chain. The power transmission mechanism further includes a first unidirectional power transmission module and a second unidirectional power transmission module, such that an auxiliary power transmitted by the power transmission mechanism from the power source to the chain is independent from an pedal power transmitted by the power transmission mechanism from the pedal drive mechanism to the chain.

In another aspect of the present invention, there is provided a method of installing a motorized driving device to a bicycle, the bicycle including a frame, a bottom bracket located at the bottom of the frame, a crank shaft rotatably hinged in the bottom bracket, a bicycle sprocket fixed to the crank shaft and on which a chain rests, and two crank arms fixed to the crank shaft. The method contains the steps of: removing the crank shaft, the crank arms and the bicycle sprocket from the bicycle; fixing a body of the motorized driving device to the frame of the bicycle; and connecting the chain to the body of motorized driving device.

In a preferred embodiment, the fixing step further comprises the steps of:

a) inserting an inner sleeve of the motorized driving device into the bottom bracket. A device shaft is rotatably received in the inner sleeve. The device shaft connects to the body of the motorized driving device.

b) tightening a screw cap on a protruding end of the inner sleeve to fix the inner sleeve to the bottom bracket.

c) positioning a screw protruding from the body between two forks of a chain stay of the frame of the bicycle.

d) placing a holding plate on the chain stay such that the chain stay is placed between the body of the motorized driving device and the holding plate. The screw penetrates the holding plate; and e) tightening a first nut on the screw to fix the holding plate to the screw, whereby the body of the motorized driving device mounted on the frame of the bicycle.

In a further aspect of the present invention, there is provided a motorized driving device for mounting on a bicycle. The bicycle includes a frame and a bottom bracket located at the bottom of the frame. The motorized driving device contains a body and an inner sleeve connected to the body. The inner sleeve is capable of inserting into the bottom bracket. The inner sleeve is capable of fixing to the bottom bracket, such that the body of the motorized driving device is secured to the frame of the bicycle.

There are many advantages to the present invention. The motorized driving device in the present invention is formed as an integrated unit which is suitable for installing on the frame of an ordinary bicycle, without having to alter the frame structure of the bicycle. As a result the motorized driving device in the present invention is widely appropriate for almost all the existing models of bicycles in the market, and consumers have their choice to easily transform their existing bicycles into an electrically motorized bicycle. As all the essential components are disposed in the body of the motorized driving device, the user no longer needs to carry out complex installation procedures such as wire connection or installing multiple components, but what they have to do is only to mount the unit on the bicycle frame. Likewise, the detachment of the motorized driving device from the frame of the bicycle is also simplified.

Moreover, the motorized driving device in the present invention includes a speed sensor and a torque sensor at the same time, such that the auxiliary power provided by the electric motor could be more accurately adjusted, which depends on the requirement of the user by sensing the manpower made by the user on the pedals. For example, when the user pushes the pedals lightly and slowly, it means that the user does not require a fast speed of the bicycle's movement or the bicycle is going down a slope, and therefore the auxiliary power provided by the electric motor could be relatively small. On the other hand, if the user pushes the pedals heavily or very rapidly, it means that the user requires a fast speed of the bicycle's movement or the bicycle is going up a slope, and therefore the auxiliary power provided by the electric motor should be adjusted to be relatively larger. One can see that due to the speed sensor and the torque sensor, the motorized driving device acts as a "gearbox" to provide automatic transmission of drive power with different levels or even continuously variable power in an intelligent way under various circumstances, just like an automatic gearbox used in an automobile.

The power transmission mechanism used in the motorized driving device in the present invention provides a highly efficient combination of drive powers from the pedals and the electric motor. Since the transmissions of rotary power from the electric motor and that from the manpower are independent from each other, the rider of the bicycle can freely choose to drive the bicycle by manpower only, by manpower and motor power, or solely by motor power. Therefore the usage of the bicycle with the motorized driving device in the present invention installed is very flexible, and provides better user experiences to the rider.

BRIEF DESCRIPTION OF FIGURES

The foregoing and further features of the present invention will be apparent from the following description of preferred embodiments which are provided by way of example only in connection with the accompanying figures, of which:

FIG. 7b illustrates another portion of the exploded view of the motorized driving device in FIG. 7a.

DETAILED DESCRIPTION OF THE PREFERRED EMBODIMENTS

In the context of this invention, the term chainwheel is taken to include a toothed wheel driven by a chain such as a bicycle chain, but also to include a belt pulley or the like driven by a belt. Consequently, a reference to a chain includes a reference to a belt or to any flexible, looped elongate means for transferring drive to a driven wheel or driven gear from a drive wheel or a drive gear or the like.

Figure 1:
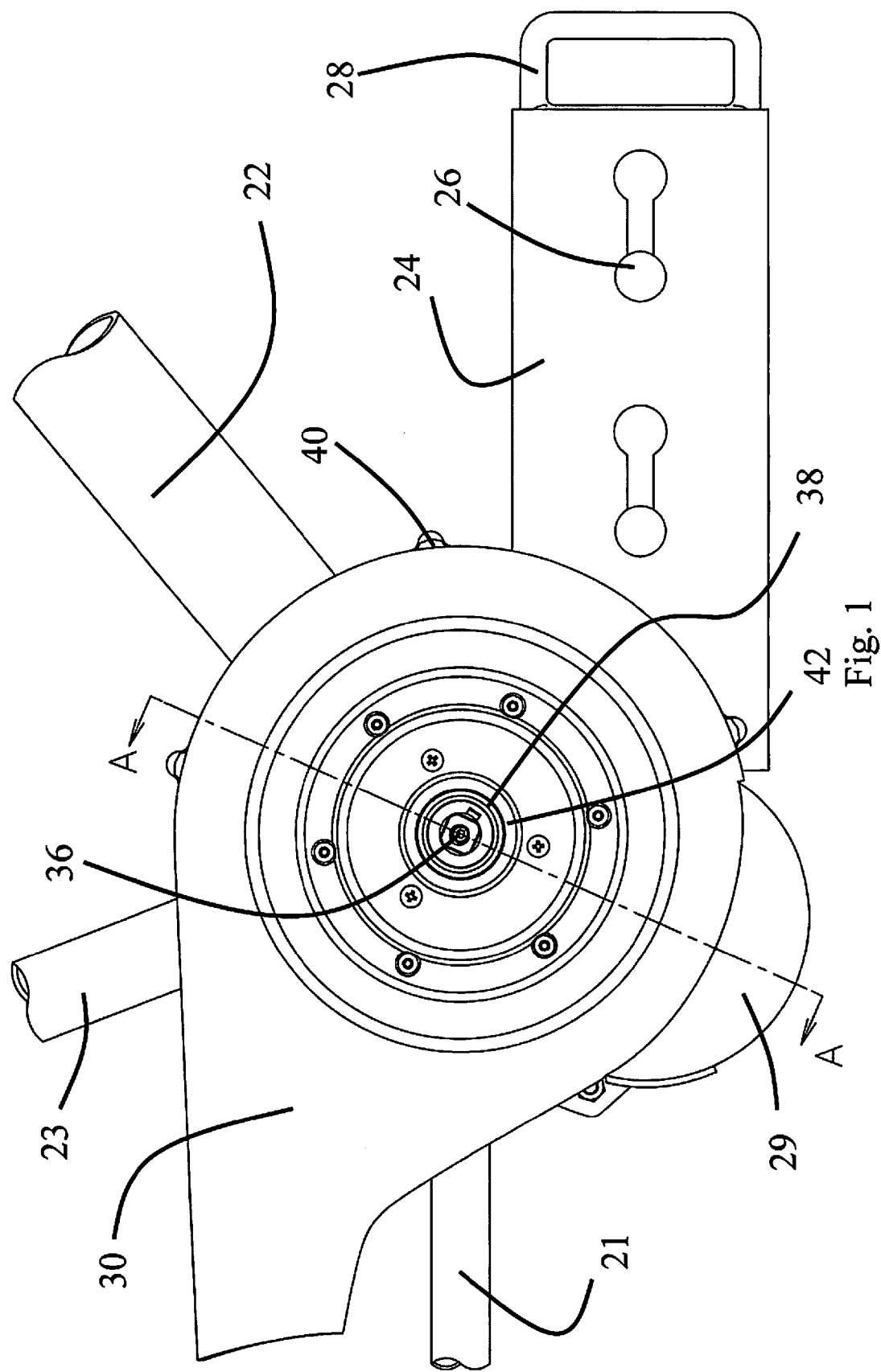
FIG. 1 is a front view of the motorized driving device when installed on a frame of a bicycle, according to one embodiment of the present invention.
Figure 2:
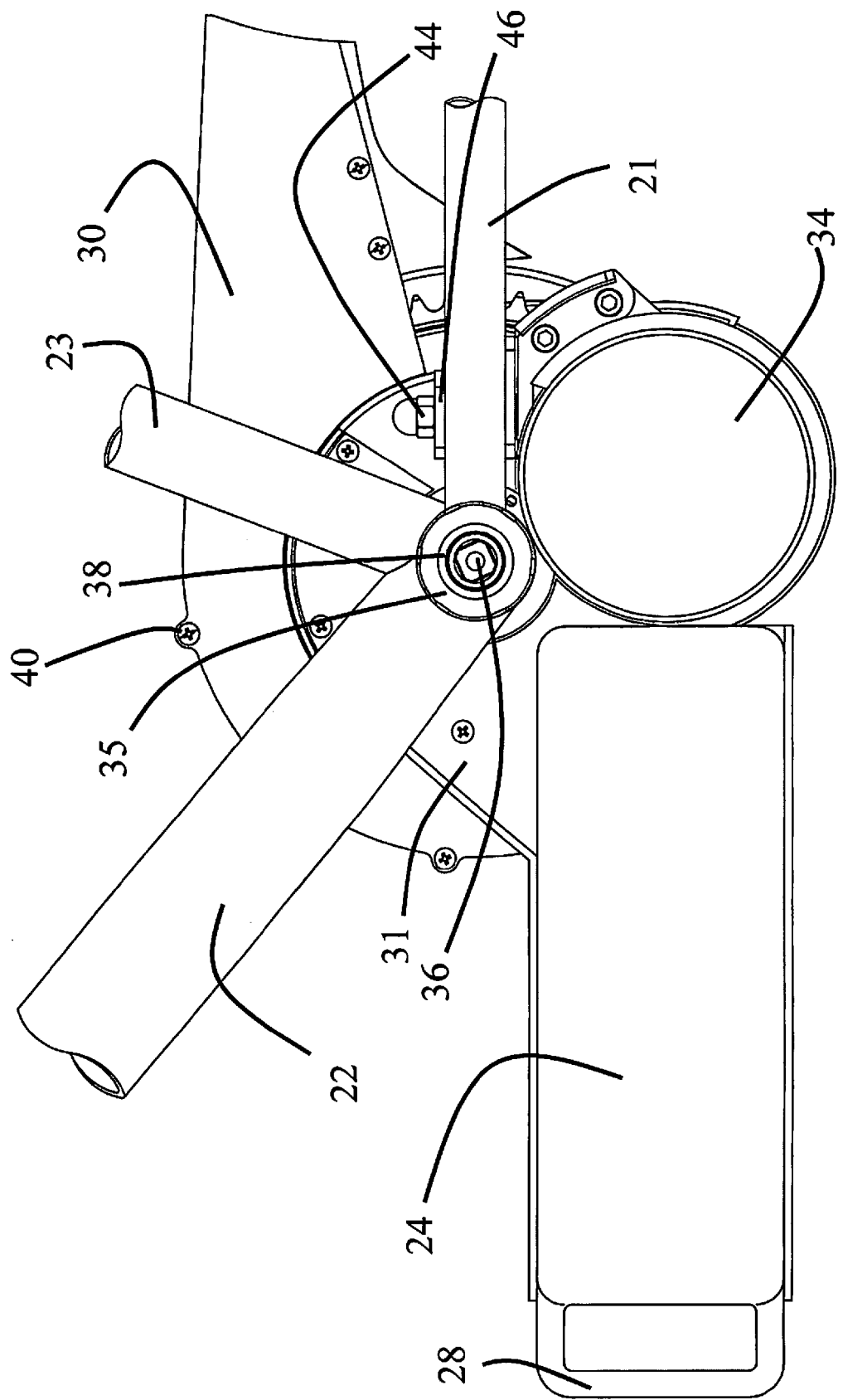
FIG. 2 is a rear view of the motorized driving device in FIG. 1.

Referring now to FIG. 1 and FIG. 2, the first embodiment of the present invention is a motorized drive device for mounting on the frame of a bicycle. The frame of the bicycle typically includes a seat tube 23, a down tube 22, and a chain stay 21. The motorized drive device is mounted onto the frame of the bicycle near the bottom bracket 42 which is at the intersection of the seat tube 23, the down tube 22, and the chain stay 21. The motorized drive device includes a power source which contains a battery pack 24 and an electric motor 34, and a power transmission mechanism which is covered and protected by various components such as a chain cover 30 and a casing 31. The power transmission mechanism includes an electric motor 34 or say gear reduction module which is attached to the electric motor 34. The output shaft (not shown) of the electric motor 34 is connected to the electric motor 34. The battery pack 24 is detachably fixed to the electric motor 34 and also electrically connected to the electric motor 34. On the battery pack 24 there is also an optional handle bar 28 for the user to remove the battery pack 24 from the motorized drive device and the bicycle for replacement. In a preferred embodiment, the battery pack 24 is fixed onto a battery fixing plate (not shown) by a clout nail, and the battery fixing plate is fixed to other components of the motorized drive device. The electric motor 34 is also covered by a casing to shield it from external damages.

The power transmission mechanism of the motorized drive device includes a device sprocket (not shown) covered by the chain cover 30, where the device sprocket is used to substitute the existing bicycle sprocket on the bicycle to provide drive power to the chain (not shown). The structure of the power transmission mechanism and its working principle will be described in more details later. The motorized drive device further includes an inner sleeve 38 preferably formed as an integrated part with the casing 30. The device shaft 36 is then rotatably received in the inner sleeve 38 of the motorized drive device. When the motorized drive device is installed on the frame of the bicycle as shown in FIG. 1, the inner sleeve 38 passes through the bottom bracket 42 and is steadily fixed to the bottom bracket 42 by the tightening of a screw cap 35 on a protruding end of the inner sleeve 38. The protruding end of the inner sleeve 38 preferably has a thread on the outer circumference to mate with the screw cap 35. Thus the motorized drive device is partially supported by the inner sleeve 38 in the bottom bracket 42. Another support for the motorized drive device is realized by a holding plate 46 and a holding screw (not shown), where the holding screw is fixed and protruding from the body of the motorized drive device. The holding plate 46 is placed on the chain stay 21 such that after the holding plate is fixed to the holding screw and thus the motorized drive device, the holding plate 46 prevents the motorized drive device from falling downward. The chain cover is detachably engaged with the casing 30 by a plurality of casing screws 40.

Figure 3:
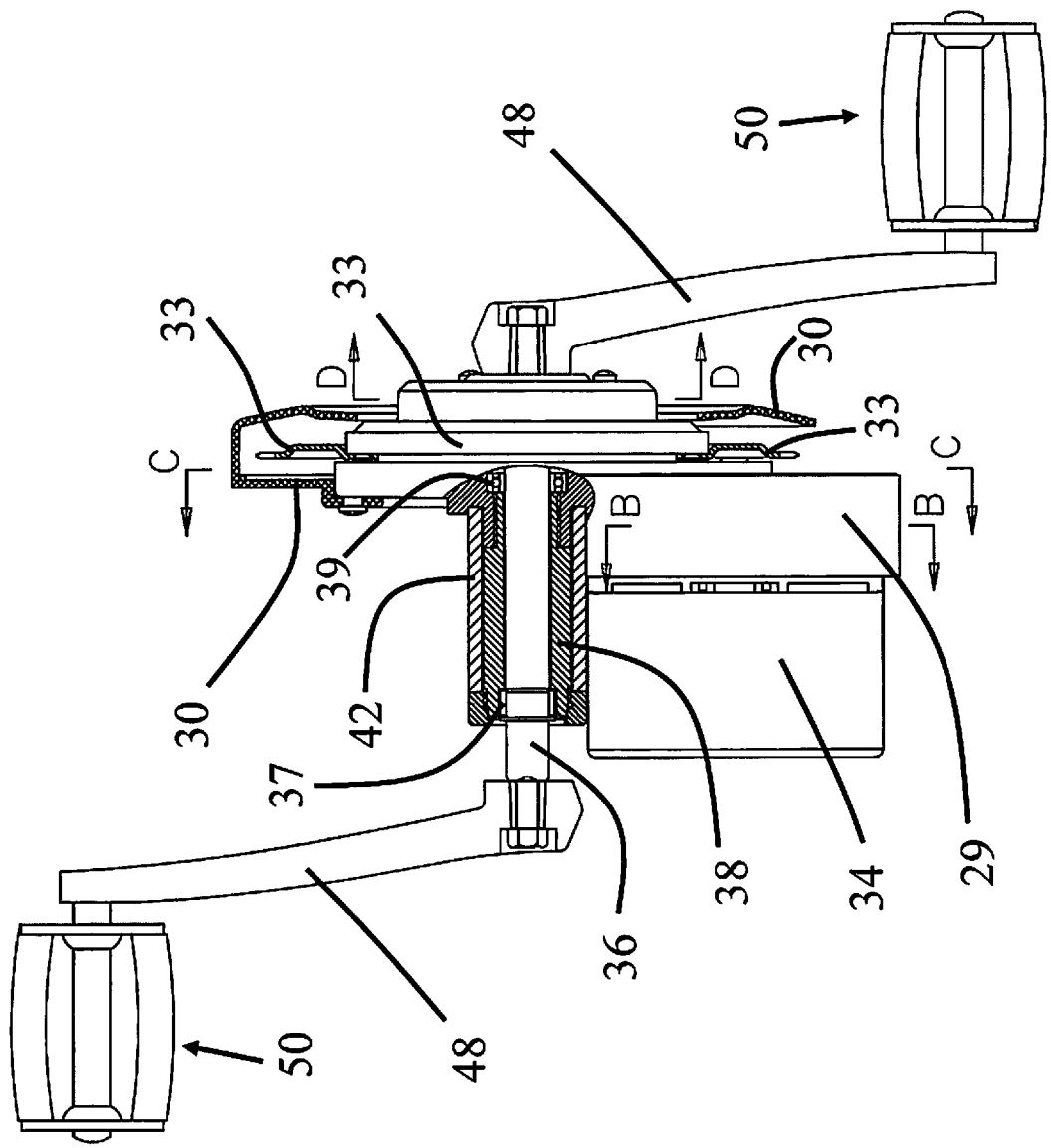
FIG. 3 shows a proportion of cross section taken along line AA of FIG. 1.

Referring now to FIG. 3, which shows a cross section of the motorized drive device according to an embodiment of the present invention. The device shaft 36 is rotatably received in the inner sleeve 38 which is in turn received by the bottom bracket 42. The inner sleeve 38 is preferably sized to fit tightly within the interior of the bottom bracket 42. That is, the outer diameter of the inner sleeve 38 has a dimension that is equal to that of the inner diameter of the bottom bracket 42 such that the inner sleeve 38 comprises a push fit into the bottom bracket 42. The outer diameter of the inner sleeve may be selected to be a tolerance fit into the interior of the bottom bracket 42. As the bottom bracket of known light vehicles such as bicycles often conform to a small number of standard sizes, it is possible to provide the motorized drive device of the invention in an equally small number of versions having inner sleeves sized according to the standard sizes of bottom brackets of existing bicycles. However, in one variation of the invention, the motorized drive device is provided with an inner sleeve outer diameter size that is sized to fit a selected standard size bicycle bottom bracket whereby such motorized driving device of the invention can be adapted to be used with bicycles having a bottom bracket of larger internal diameter than the outer diameter of the inner sleeve of the motorized driving device. In this instance, the inner sleeve of the motorized driving device may be adapted to fit within the interior of the 'over-sized' bottom bracket of the bicycle by means of providing the motorized driving device with an auxiliary sleeve sized to slidably fit over the outer diameter of the inner sleeve and sized to slidably fit inside the interior of the bottom bracket. In each case, the fit may be a friction/push/tolerance fit. In this variation of the motorized driving device, the outer diameter of the inner sleeve may be sized to fit a smallest known standard sized bicycle bottom bracket with the motorized driving device being provided with one or more auxiliary sleeves enabling said driving device to be mounted to a standard sized bottom bracket using a suitably sized one of the auxiliary sleeves.

On both ends of the device shaft 36 a crank arm 48 is connected. The crank arm 48 is a standard part of a bicycle on one end of which a pedal 50 is rotatably arranged. The crank arm 48 and the pedal 50 together are also called a pedal drive mechanism. the Around the device shaft 36 there are two bearings 37 and 39 located approximately at the two ends of the inner sleeve 38. The bearings 37 and 39 are used to support the device shaft 36 and allow the same to rotate. In one embodiment the bearing 39 is a ball bearing. The device shaft 36 passes through in sequence a device sprocket 33, an active flange 60 and a passive flange 62 in their axial directions. The device shaft 36 is fixed to the active flange 60 so that they rotate at the same time, but it is not fixed to the device sprocket 33 or the passive flange 62. Nonetheless, both the passive flange 62 and the active flange 60 are fixed to device sprocket 33. The device sprocket 33 has a portion of chain (not shown) of the bicycle mounted thereon.

Figure 4:
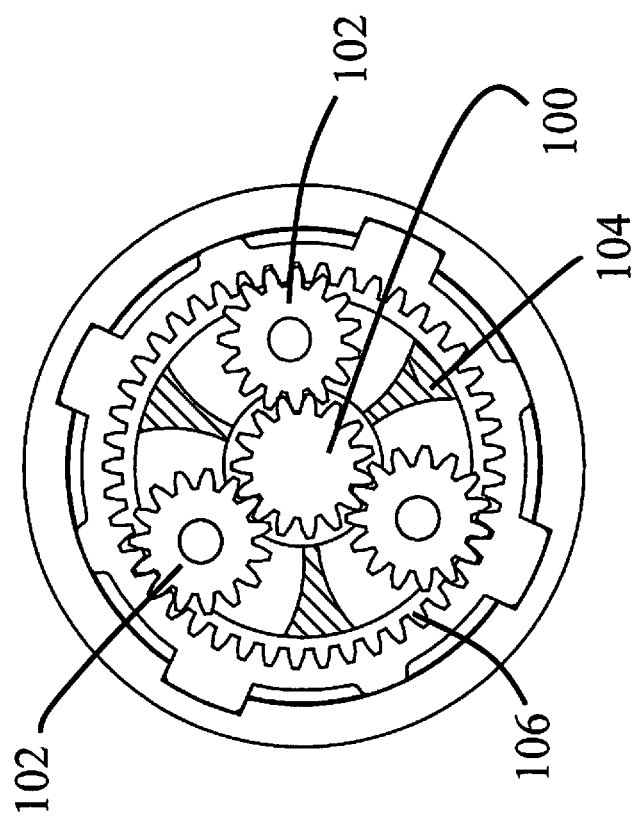
FIG. 4 shows a proportion of cross section taken along line BB of FIG. 3.

FIG. 4 shows the cross section of a portion of the internal structure of the gear reduction box 29. A two-stage gear reduction module is contained in the gear reduction box 29, and FIG. 4 shows the first stage of gear reduction which is a planet gear reduction stage. The planet gear reduction stage contains a ring gear 106, a sun gear 100, three planet gears 102, and a planet carrier 104. The sun gear 100 directly connects to the output shaft (not shown) of the electric motor 34 and receives the rotary power therefrom. The three planet gears 102 are arranged in symmetrical positions with the angle difference between the axes of any two planet gears 102 is around 120°. The ring gear 106 is a fixed part but the planet gears (thus the planet carrier) and the sun gear are rotatable. Each planet gear 102 engages with the sun gear 100 on one side of the planet gear 102, and engages with the ring gear 106 on the other side. The rotary power outputted by the electric motor goes from the sun gear 100 to the planet gears 102 and then to the planet carrier 104. Since the ring gear 106 is fixed, the angular rotation speed outputted by the planet carrier 104 is smaller than that of the sun gear 100, but the torque outputted by the planet carrier 104 is larger than that of the sun gear 100. The planet carrier 104 further connects to the second stage of the gear reduction box 29 and outputs rotary power thereto, which will described in the following section.

Figure 5:
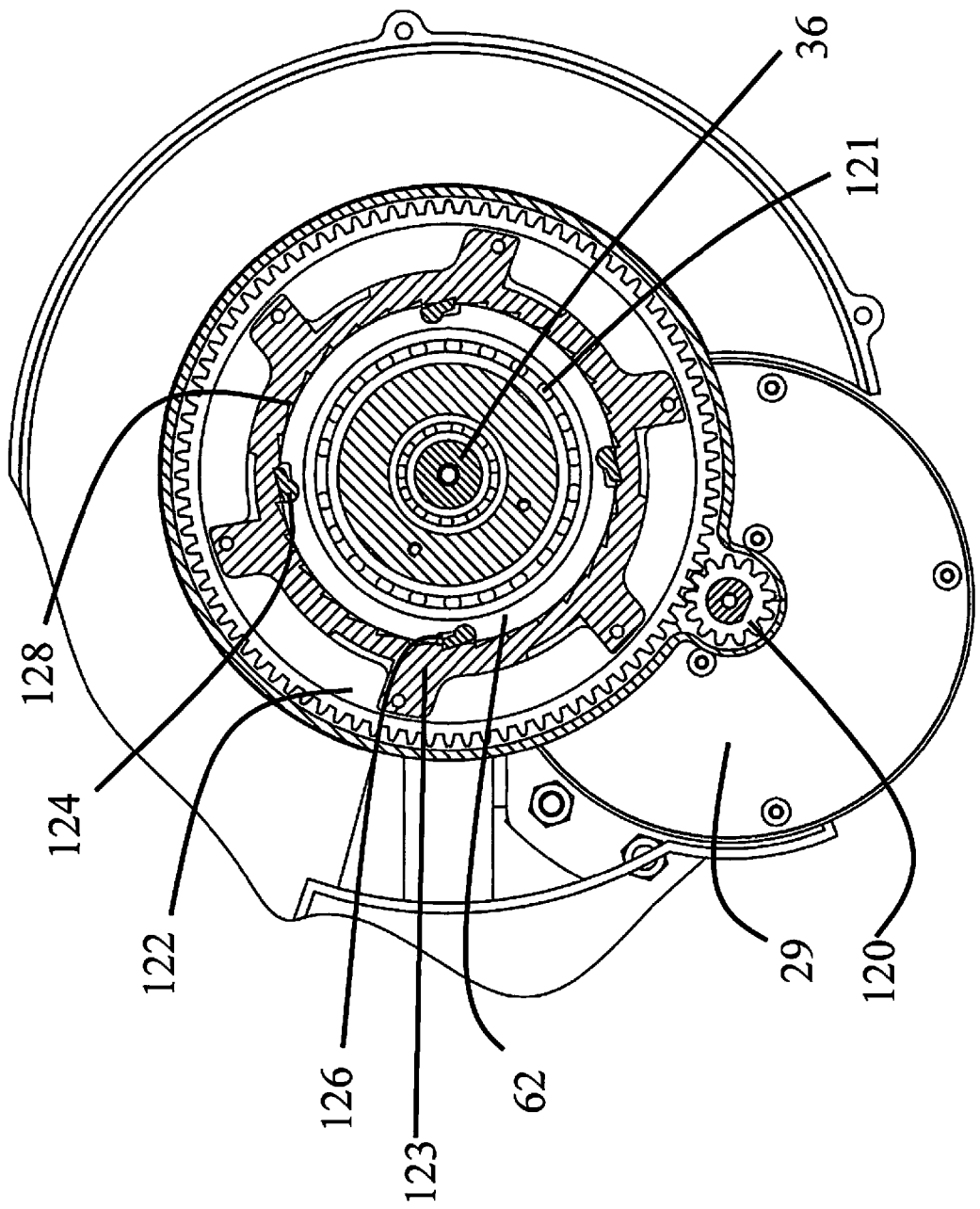
FIG. 5 shows a proportion of cross section taken along line CC of FIG. 3.

Referring now to FIG. 5, there is shown a second stage of gear reduction of the gear reduction box 29 which is a cylindrical gear reduction stage. The cylindrical gear reduction stage contains a subsidiary gear 120 and a primary gear 122 engaging with each other. The subsidiary gear 120 is fixed to the shaft of the planet carrier 104 and receives the output rotary power from the planet carrier 104. In operation, since the radius of the subsidiary gear 120 is smaller than that of the primary gear 122, the angular rotation speed outputted by the primary gear 122 is smaller than that of the subsidiary gear 120, but the torque outputted by the primary gear 122 is larger than that of the subsidiary gear 120.

In one embodiment, the power transmission mechanism of the motorized drive device includes the active flange (not shown) and the passive flange 62. The passive flanged 62 and the active flange belong to a first unidirectional power transmission module and a second unidirectional power transmission module respectively. FIG. 5 shows a portion of the power transmission mechanism which is the first unidirectional power transmission module. The first unidirectional power transmission module includes a plurality of first pawl bases 126 fixed to the passive flange 62, a plurality of first pawls 124 each disposed in one of the plurality of first pawl bases 126, and a plurality of first saw teeth 128 formed on the inner circumference of a first ratchet 123. The first ratchet 123 is in turn mounted on an inner circumference of the primary gear 122. The first saw teeth 128 engages with the plurality of first pawls 124 in a way that when the primary gear 122 rotates in a first direction with respect to the passive flange 62, the plurality of first saw teeth 128 drive the plurality of first pawls 124 and ultimately the passive flange 62 to move in the first direction. When the passive flange 62 rotates in the first direction with respect to the primary gear 122, the primary gear 122 is not driven by the plurality of first pawl 124 and the passive flange 62. This unidirectional or one-way power transmission is achieved by the free-engage mechanism of the first pawls 124 and the first saw teeth 128 on the first ratchet 123. In the embodiment shown in FIG. 5, when the primary gear 122 rotates in a counterclockwise direction, the first saw teeth 128 of the first ratchet 123 lock with the first pawls 124, making the passive flange 62 rotates at the same speed. If the primary gear 122 slows down or stops rotating, but the passive flange 62 rotates in the counterclockwise direction faster than the primary gear 122, the first pawls 124 slip over the first saw teeth 128 of the first ratchet 123, and the passive flange 62 continue rotating, producing a clicking sound. When the passive flange 62 rotates in a direction faster than the primary gear 122 which is rotating in the same direction, or when the passive flange 62 rotates in a direction while the primary gear 122 is still, it is generally referred to as the passive flange 62 rotates in a direction with respect to the primary gear 122, and vice versa.

The rotation of the passive flange 62 would not drive the device shaft 36, because of the ball bearing existing between the passive flange 62 and the device shaft 36. However, the rotary power outputted by the electric motor after passing the gear reduction box and the power transmission mechanism would go to the passive flange 62 which is fixed to the device sprocket 33, but the rotation of the device sprocket 33 would not affect the status of the device crank 36, which will be described below.

Figure 6:
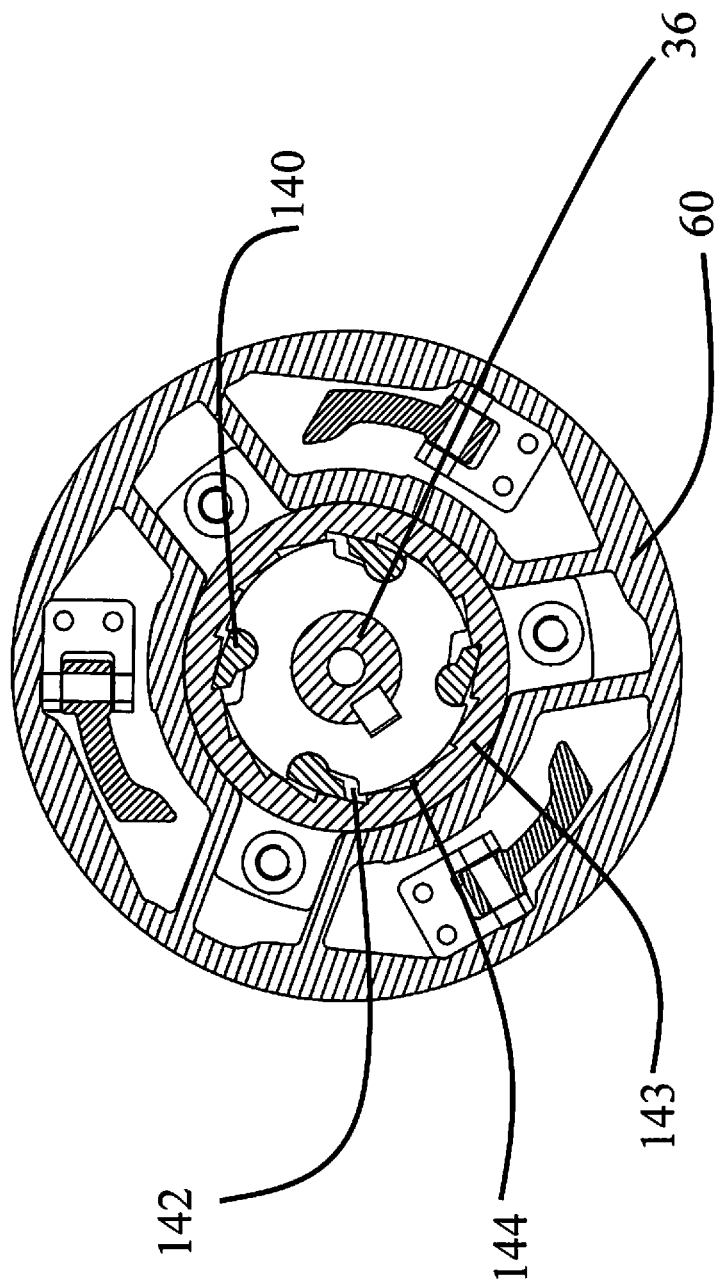
FIG. 6 shows a proportion of cross section taken along line DD of FIG. 3.

Referring now to FIG. 6, a cross section of the second unidirectional power transmission module is shown. The second unidirectional power transmission module includes a plurality of second pawl bases 142, a plurality of second pawls 140, and a second ratchet 143. The second pawl bases 142 are fixed to the crank shaft 36 which is capable of fitting into the pedal driving mechanism of the bicycle. The plurality of second pawls 140 each is disposed in one of the plurality second pawl bases 142. The second ratchet 143 further includes a plurality of second saw teeth 144 on the inner circumference of the second ratchet 143. The second ratchet 143 is fixed on the inner circumference of the active flange 60.

The plurality of second saw teeth 144 of the second ratchet 143 engage with the plurality of second pawls 144 in a way that when the crank shaft 36 rotates in a first direction with respect to the active flange 60, the plurality of second pawl bases 142 drive the active flange 60 to move in the first direction. When the active flange 60 rotates in the first direction with respect to the crank shaft 36, the crank shaft 36 is not driven by the active flange 60. The free-engage mechanism of the second unidirectional power transmission module is similar to that described for the first unidirectional power transmission module, and will not be repeated here. Again, when the active flange 60 rotates in a direction faster than the crank shaft 36 which is rotating in the same direction, or when the active flange 60 rotates in a direction while the crank shaft 36 is still, it is generally referred to as the active flange 60 rotates in a direction with respect to the crank shaft 36, and vice versa.

Figure 7A:
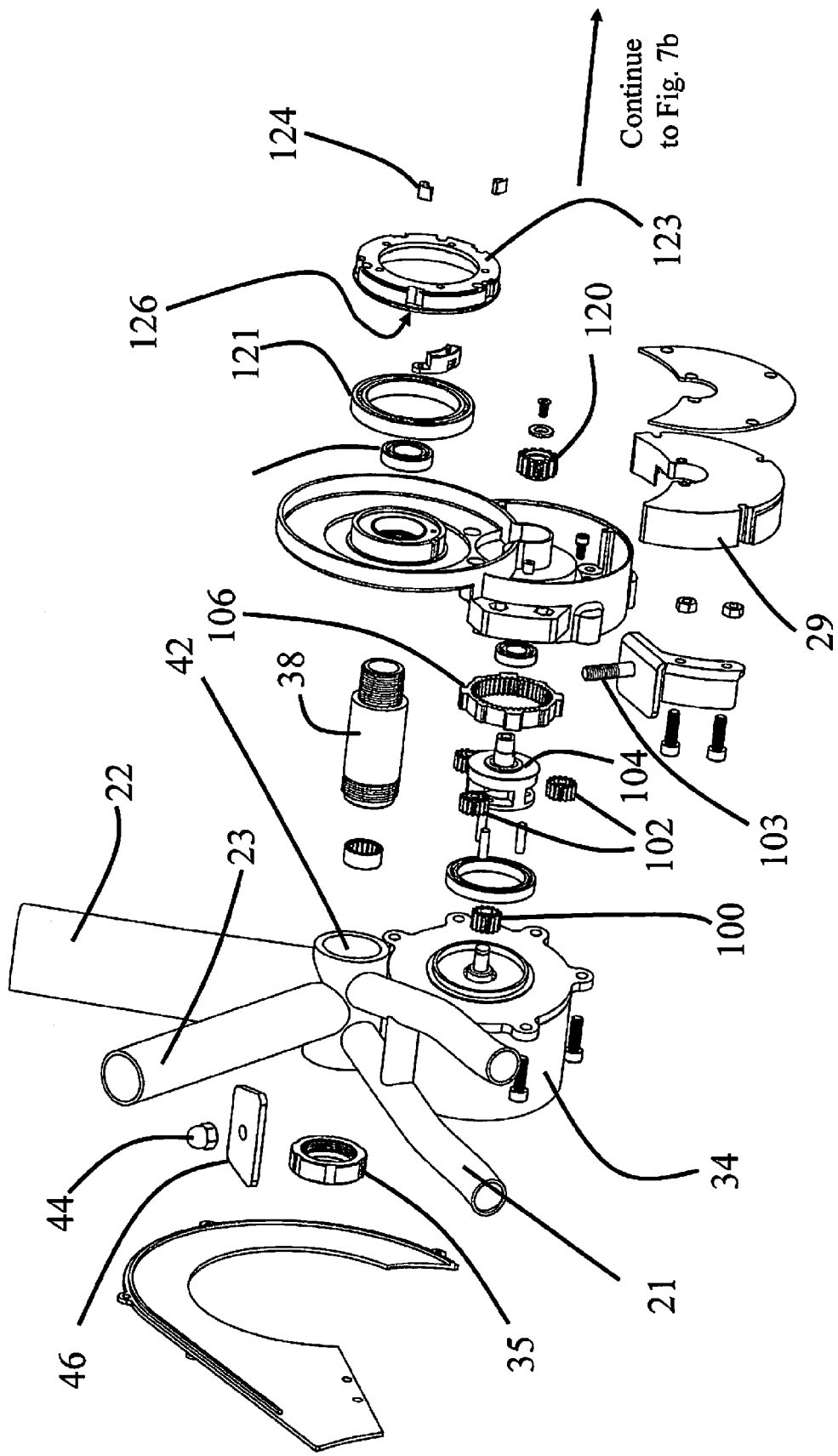
FIG. 7a illustrates a portion of the exploded view of the motorized driving device according to one embodiment of the present invention.
Figure 7B:
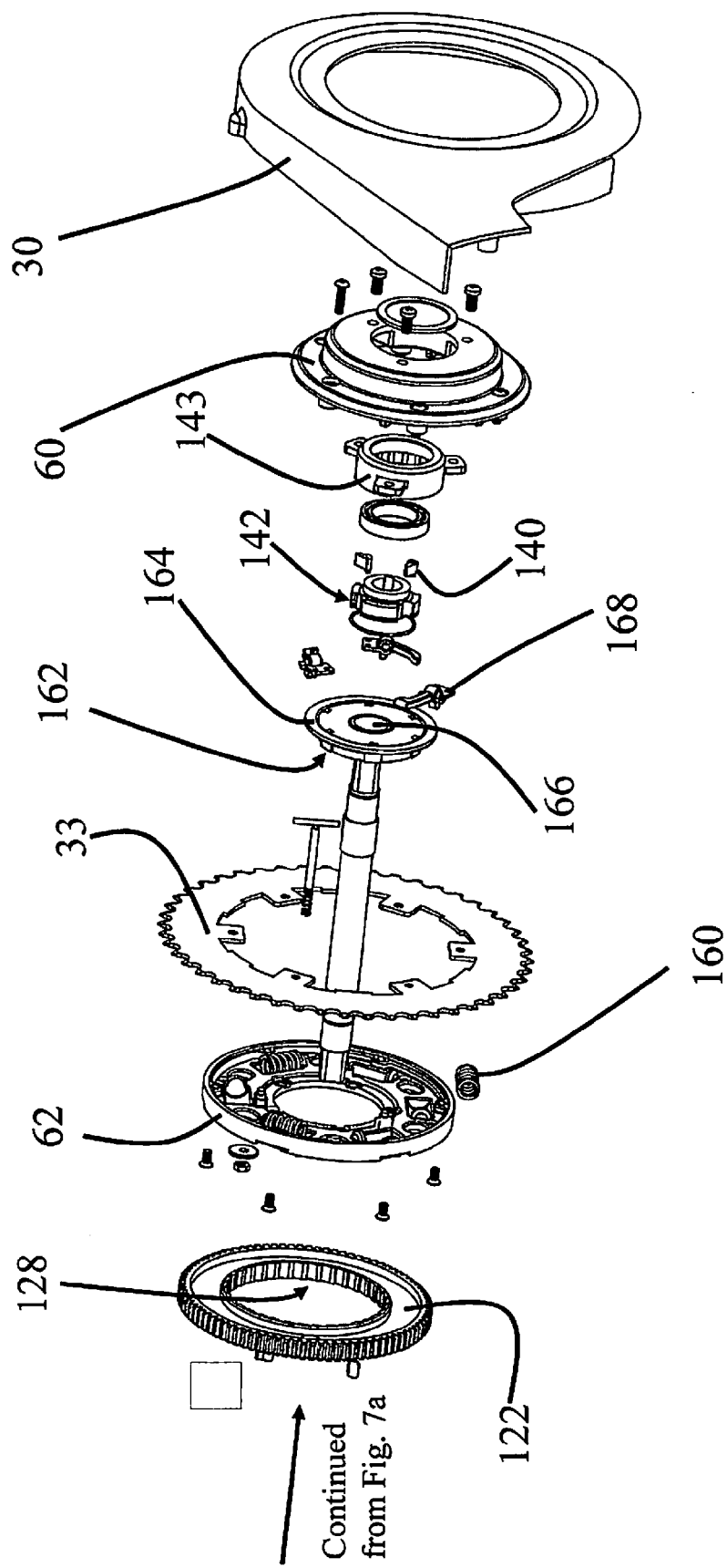

An exploded view of the various components of the motorized drive device as described above in shown from FIG. 7a to FIG. 7b to better illustrate the embodiments of the present invention, with like reference characters refer to like parts.

Figure 8:
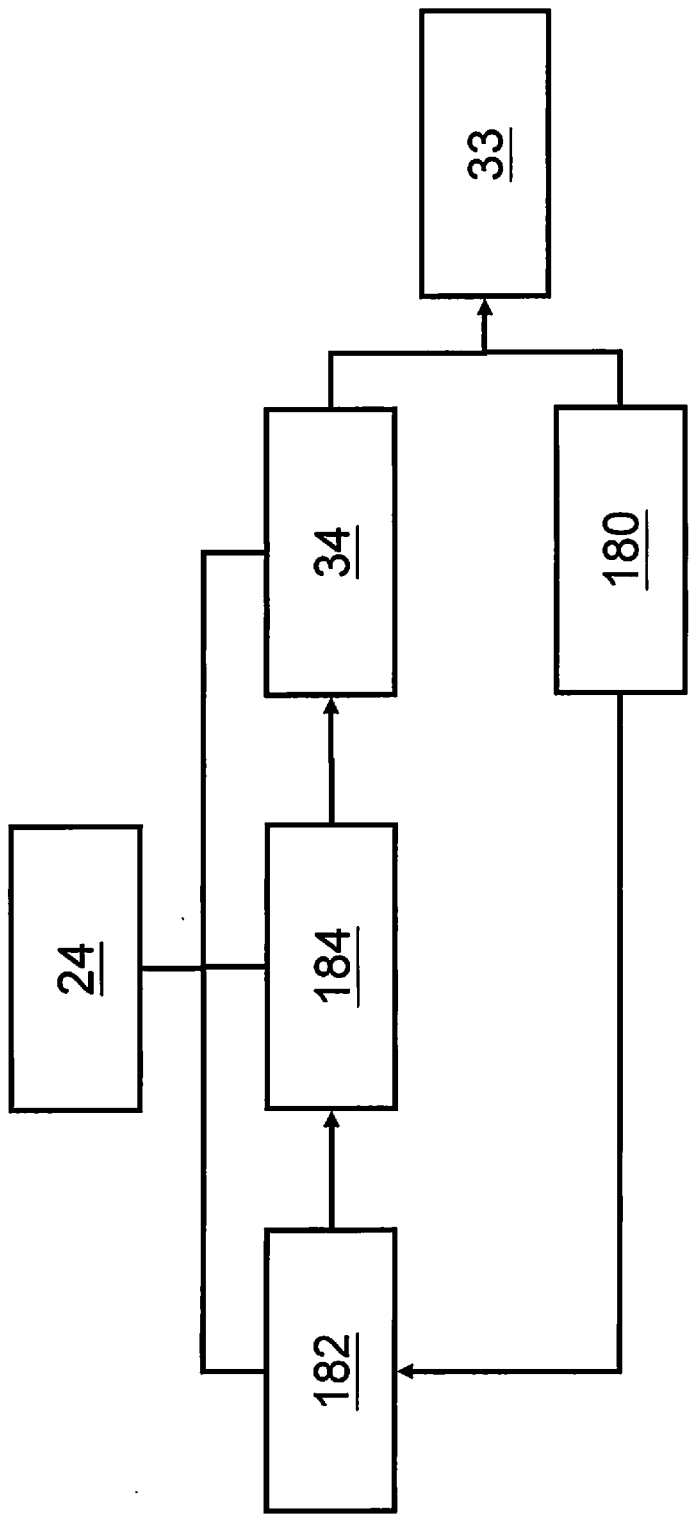
FIG. 8 is a block diagram showing the system structure of the motorized driving device with a sensor module, according to one embodiment of the present invention.

Furthermore, in one embodiment of the present invention the motorized drive device contains a sensor module for sensing a pedal strength and a pedal speed that the rider makes on the pedal driving mechanism (i.e. the crank arms and pedals) of the bicycle. An exemplary embodiment of the motorized drive device is shown in FIG. 8. The electric motor 34 and the pedal driving mechanism 180 both output rotary powers to the device sprocket 33 independently via the power transmission mechanism as described above. A sensor module 182 detects the pedal strength and the pedal speed from the pedal driving mechanism 180, and outputs data representing the pedal strength and the pedal speed to the controller 184. The controller 184 then send appropriate control signal to the electric motor 34 depending on the sensor data. The batter pack 24 provides electric power to the electric motor 34, the sensor module 182 and the controller 184. The sensor module 182 contains a speed sensor (not shown) and a torque sensor (not shown) to measure the pedal speed and the pedal strength respectively.

Returning to FIGS. 7a and 7b, in one embodiment the motorized drive device includes a push plate 164 centrally fixed onto the crank shaft 36 which is capable of fitting into the pedal driving mechanism, a shift lever 168 with its one end connecting to an outer circumference of the push plate 164, and at least one spring 160 toroidally arranged between the active flange 60 and the passive flange 62. When the rider pushes the pedals to cause the active flange 60 to rotate due to the pedal power, the spring 160 is compressed, which in turn causes an angular displacement of the active flange 60 with respect to the passive flange 62 that drives the shift lever 168 to rotate. The shift lever 168 then pushes the push plate 164 to move in the axial direction of the crank shaft 36. The speed sensor includes a first Hall effect sensor (not shown) and at least one speed sensing magnet 162. The torque sensor includes a second Hall effect sensor (not shown) and a torque sensing magnet 166. On the push plate 164, there are mounted the least one speed sensing magnet 162, and the torque sensing magnet 166. The torque sensing magnet 166 is preferably a ring-shaped magnet. When the push plate 164 rotates due to the rotation of the crank shaft 36, the at least one speed sensing magnet 162 also rotates to incur a variation of a magnetic field generating by the speed sensing magnet 162. The first Hall effect sensor then detects the variation of the magnetic field as an indication of the pedal speed. The detected variation signal is then sent to the controller 184 for further manipulation. On the other hand, when the push plate 164 is pushed in the axial direction of the crank shaft 36 by the shift lever 168, the magnet ring 166 also moves together with the push plate 164 to incur a variation of a magnetic field generating by the magnet ring 166. The second Hall effect sensor then detects the variation of the magnetic field generated by the magnet ring 166 as an indication of the pedal strength. The detected variation signal is again sent to the controller 184 for controlling the operations of the electric motor 34.

Now turning to the operation of the device described above, one can see that when the rider pushes the pedals of the bicycle, the manpower will be converted to rotary power of the device sprocket by the pedal drive mechanism, just like any ordinary bicycle in the art. However, the sensor module as described above also detects the speed and strength of the pedal power made by the rider, and the operation of the electric motor is adjusted according to the sensor data. Therefore, depending on different speeds and strengths of the pedal power made by the rider, the electric motor can provide no auxiliary power, a partial auxiliary power, or a full auxiliary power to the device sprocket, in order to assist the bicycle's movement.

Figure 9:
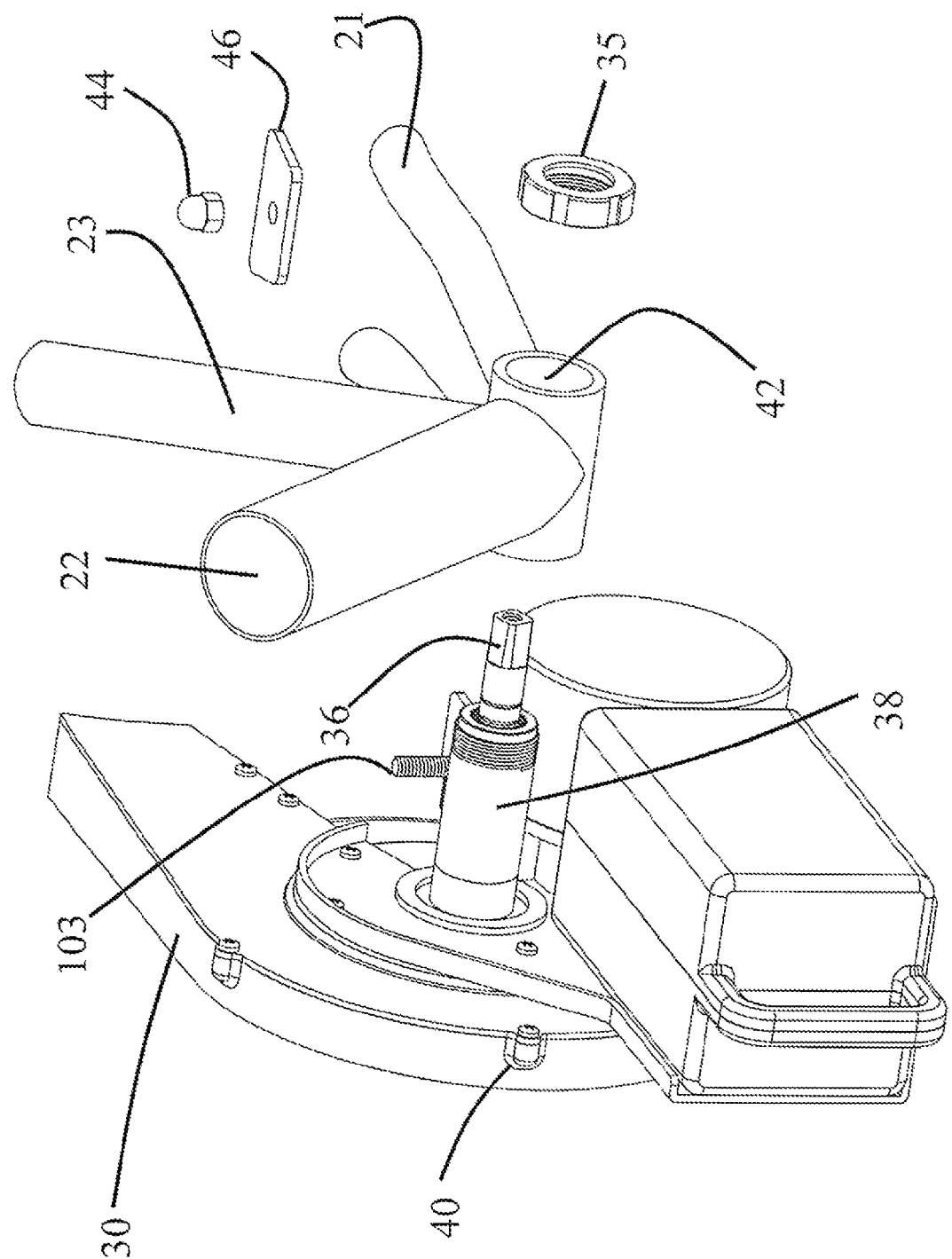
FIG. 9 shows the method of installing a motorized driving device to a bicycle according to one embodiment of the present invention.

Another aspect of the present invention discloses a method of installing a motorized drive device described above to a standard bicycle. Turning now to FIG. 9, the bicycle to be installed with a motorized drive device contains a frame which includes a chain stay 21 with two forks, a seat tube 23 and a down tube 22. A bottom bracket 42 is located at the bottom of the frame. A crank shaft (not shown) is rotatably hinged in the bottom bracket 42. A bicycle sprocket (not shown) is fixed to the crank shaft and on which a chain rests, and two crank arms (not shown) are fixed to the crank shaft. To install the motorized drive device to the bicycle, one first needs to remove the original crank shaft, crank arms with pedals and bicycle sprocket from the bicycle, in order to allow the motorized drive device to be mounted. The next step is to fix the body of the motorized driving device to the frame of the bicycle. First, insert an inner sleeve 38 of the motorized driving device into the bottom bracket 42. The device shaft 36 is rotatably received in the inner sleeve 38 when the motorized driving device is manufactured. Then, tighten the screw cap 35 on a protruding end of the inner sleeve 38 to fix the inner sleeve 38 to the bottom bracket 42. Next, position the holding screw 103 protruding from the body to be between the two forks of the chain stay 21 of the frame of the bicycle. Then, place a holding plate 46 on the chain stay 21 such that the chain stay 21 is placed between the body of the motorized driving device and the holding plate 46. The holdings screw 103 penetrates the holding plate 46. Finally, tighten a first nut 44 on the holdings screw 103 to fix the holding plate 46 to the holdings screw 103, therefore the body of the motorized driving device is mounted on the frame of the bicycle.

After the body of the motorized driving device is mounted on the frame of the bicycle, one further step to do is to connect the chain (not shown) of the bicycle to the body of motorized driving device. The motorized driving device contains a chain cover 30 detachably attached to the body of the motorized driving device, and the device sprocket (not shown) is received in the chain cover 30. First, detach the chain cover 30 from the body of said motorized driving device. Next, mount a portion of the chain of the bicycle on the device sprocket (not shown). Finally, reattach the chain cover 30 to the body of the motorized driving device. Preferably, the chain cover 30 is attached to the body of the motorized driving device by using more than one casing screws 40.

In one embodiment, after the body of the motorized driving device is mounted on the frame of the bicycle, the user further re-install the crank arms and the pedals back to the bicycles. Since the device shaft 36 is rotatably received the bottom bracket 42 of the motorized driving device and the two ends of the device shaft 36 protrude from respective ends of the bottom bracket 42, the user then position a crank arm to have one end of the device shaft passing through a perforation formed on one end of the crank arm opposite to the pedal. After the crank arm is positioned, the user then uses a nut (not shown) to fixed the crank arm to the device shaft 36. The pair of crank arms and the pedals is thus fixed to the motorized driving device in this way.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

It is to be understood that, if any prior art publication is referred to herein, such reference does not constitute an admission that the publication forms a part of the common general knowledge in the art, in Australia or any other country.

Figure 10:
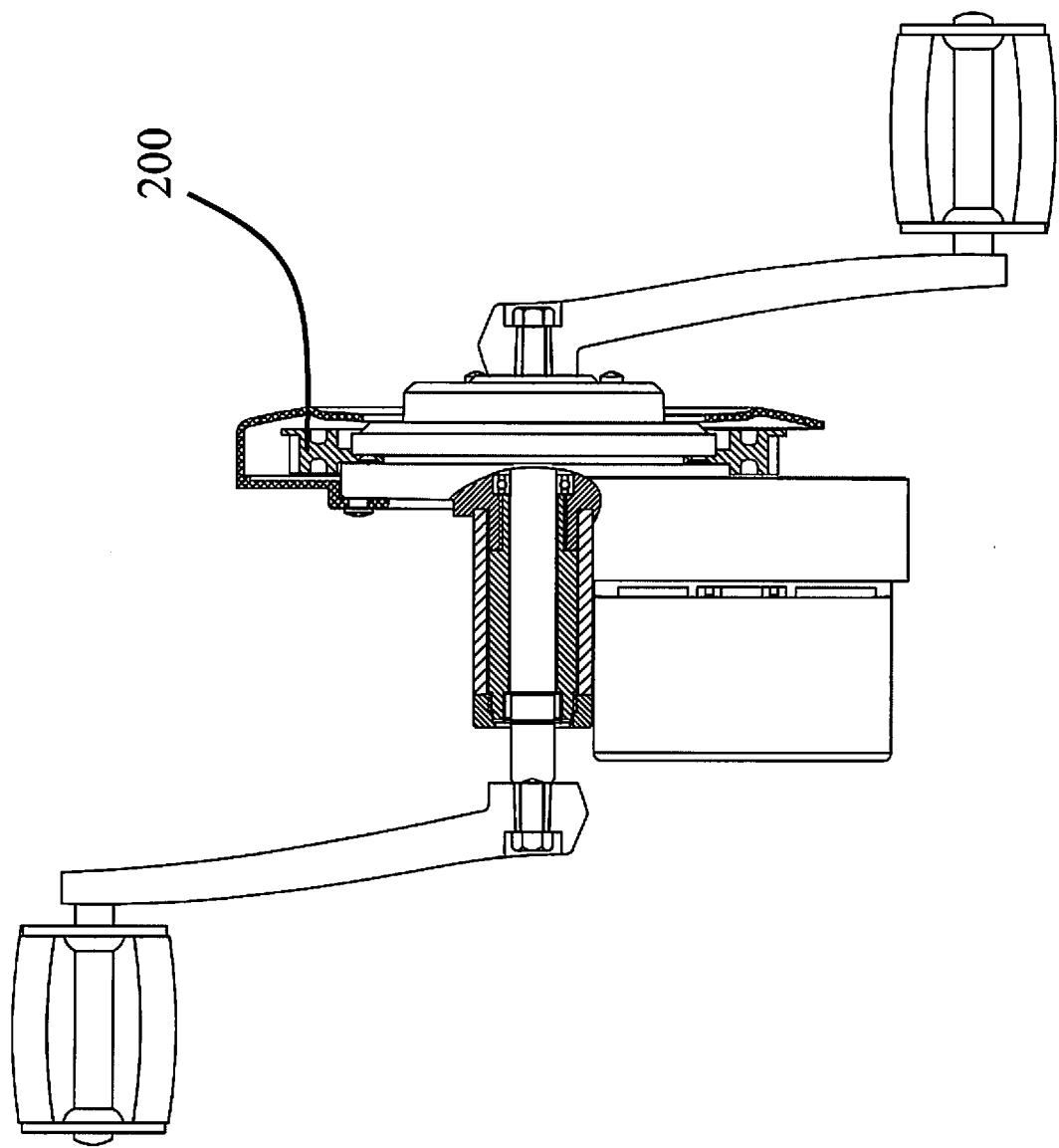
FIG. 10 is an illustration of the cross section of the motorized driving device according to another embodiment of the present invention.

For example, the bicycle with the motorized drive device described in the embodiments above utilizes a chain to transfer rotary power from the sprocket to at least one wheel. However, one skilled in the art should realized that other kinds of power transmission means could also be utilized to transfer rotary power from the sprocket to the at least one wheel. One example is shown in FIG. 10, where a belt 200 instead of a chain is mounted on the sprocket and the wheel.

The above embodiments described a torque sensor in the sensor module which utilizes a magnet ring placed on a push plate, and that the variation of the magnetic field changes when the push plates moves in the axial direction of the crank shaft, indicating the torque of the pedal power. Nonetheless, other kinds of torque sensors may also be used as long as they can provide desired sensing effect as mentioned above. For example, in one embodiment, the torque sensor of the motorized drive device may include a magneto-elastic ring centrally fixed on the crank shaft of the motorized drive device. The torque sensor also has a Hall effect sensor. The Hall effect sensor is capable of detecting a magnetic field generated by the magneto-elastic ring when the magneto-elastic ring is rotating as driven by the crank shaft. Therefore, the magnetic field also indicates the pedal strength. In a preferred embodiment, the magneto-elastic ring is made of titanium-nickel material.

Figure 11:
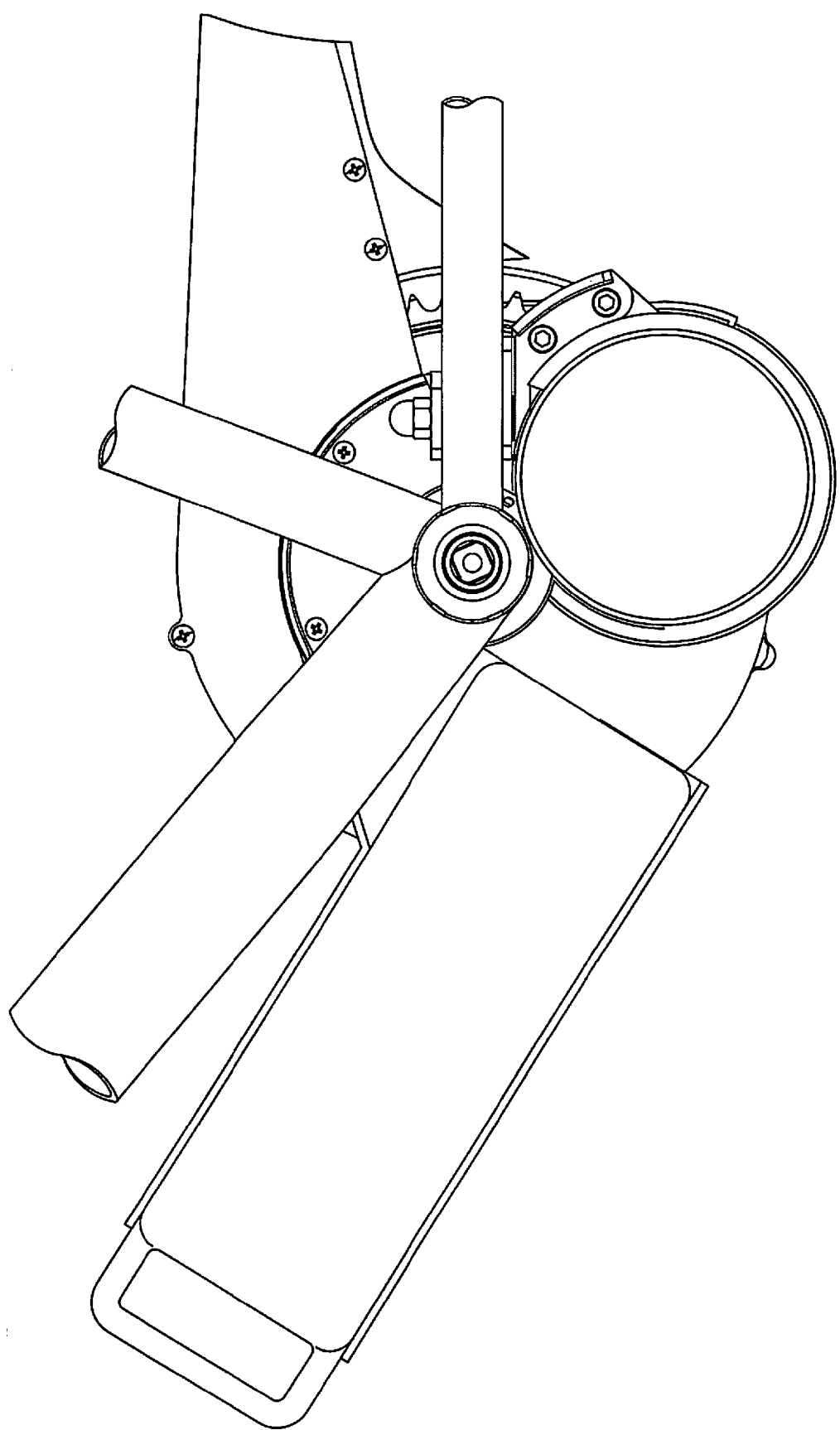
FIG. 11 is a rear view of the motorized driving device when installed on a frame of a bicycle, according to another embodiment of the present invention.

In the embodiments as shown in FIG. 1 and FIG. 2, the battery pack and the battery fixing plate are placed in parallel with the longitudinal direction of the chain stay. However, the battery pack can actually be placed at any position on the frame structure of the bicycle, and with any orientation. The embodiment in FIG. 11 shows the battery pack is placed in an inclined orientation from the longitudinal direction of the chain stay. However, one skilled in the art may also think of other ways of installing the battery pack, such as installing the battery pack on a seat tube, a top tube, or a handlebar of the bicycle. When the battery pack is installed remote to other parts of the motorized drive device, the power could be provided to the other parts by using wires.

In the embodiments mentioned above, the pedal drive mechanism driven by manpower and the electric motor both provide driving powers to the chain of the bicycle independently. This is just one implementation of the drive power module of the bicycle with a motorized driving device in the present invention. One skilled in the art could naturally think of other types of power configurations, according to different purposes. One example is that the pedal drive mechanism does not output any physical drive power to the sprocket and chain of the bicycle. Rather, the pedal drive mechanism only serves as a user input means, such as when the rider pushes the pedals in different strength and speed, the sensor will detect such information and send the same to the controller as a user command. The electrical motor as the sole module for outputting drive power would then provide drive power to the bicycle according to the user's pedaling activities.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A motorized driving device for mounting to a frame of a bicycle, said bicycle comprising a pedal drive mechanism coupled to a chain for transferring a drive force to at least one chainwheel, said motorized driving comprising:
   a) a power source of rotary power, said power source further comprising:
      i) a battery pack; and
      ii) an electric motor coupled to said power transmission mechanism; said battery pack detachably fixed to said electric motor; said battery pack electrically connecting to said electric motor to provide electric power to said electric motor; and
   b) a power transmission mechanism for coupling between said pedal drive mechanism and said chain; said power transmission mechanism further comprising a first unidirectional power transmission module and a second unidirectional power transmission module, such that an auxiliary power transmitted by said power transmission mechanism from said power source to said chain is independent from a pedal power transmitted by said power transmission mechanism from said pedal drive mechanism to said chain;
   wherein said first unidirectional power transmission module further comprising an active flange for coupling to said pedal drive mechanism, and said second unidirectional power transmission module further comprises a passive flange coupled to said power source; said active flange providing said pedal power from said pedal drive mechanism to said chain; said passive flange providing said auxiliary power from said power source to said chain; said first unidirectional power transmission module further comprising:
      i) a plurality of pawl bases fixed on said passive flange;
      ii) a plurality of pawls each disposed in one of said plurality of pawl bases; and
      iii) a first ratchet mounted on an inner circumference of a primary gear; said first ratchet further comprising a plurality of first saw teeth formed on an inner circumference of said first ratchet; said plurality of first saw teeth engaging with said plurality of pawls in a way that when said primary gear rotates in a first direction with respect to said passive flange, said plurality of pawls driving said passive flange to move in said first direction; when said passive flange rotates in said first direction with respect to said primary gear, said primary gear not driven by said passive flange.

2. A light vehicle having a motorized driving device according to claim 1.

3. The light vehicle of claim 2, wherein said light vehicle is a bicycle.

4. A motorized driving device for mounting to a frame of a bicycle, said bicycle comprising a pedal drive mechanism coupled to a chain for transferring a drive force to at least one chainwheel, said motorized driving comprising:
   a) a power source of rotary power, said power source further comprising:
      i) a battery pack; and
      ii) an electric motor coupled to said power transmission mechanism; said battery pack detachably fixed to said electric motor; said battery pack electrically connecting to said electric motor to provide electric power to said electric motor; and
   b) a power transmission mechanism for coupling between said pedal drive mechanism and said chain; said power transmission mechanism further comprising a first unidirectional power transmission module and a second unidirectional power transmission module, such that an auxiliary power transmitted by said power transmission mechanism from said power source to said chain is independent from a pedal power transmitted by said power transmission mechanism from said pedal drive mechanism to said chain;
   wherein said first unidirectional power transmission module further comprising an active flange for coupling to said pedal drive mechanism, and said second unidirectional power transmission module further comprises a passive flange coupled to said power source; said active flange providing said pedal power from said pedal drive mechanism to said chain; said passive flange providing said auxiliary power from said power source to said chain; said second unidirectional power transmission module further comprising:
      i) a plurality of pawl bases fixed to a crank shaft which is capable of fitting into said pedal driving mechanism;
      ii) a plurality of pawls each disposed in one of said plurality pawl bases; and
      iii) a second ratchet mounted on an inner circumference of said active flange; said second ratchet further comprising a plurality of second saw teeth formed on an inner circumference of said second ratchet; said plurality of second saw teeth engaging with said plurality of pawls in a way that when said crank shaft rotates in a first direction with respect to said active flange, said plurality of pawl bases driving said active flange to move in said first direction; when said active flange rotates in said first direction with respect to said crank shaft, said crank shaft not driven by said active flange.

5. A motorized driving device for mounting to a frame of a bicycle, said bicycle comprising a pedal drive mechanism coupled to a chain for transferring a drive force to at least one chainwheel, said motorized driving comprising:
   a) a power source of rotary power, said power source further comprising:
      i) a battery pack; and
      ii) an electric motor coupled to said power transmission mechanism; said battery pack detachably fixed to said electric motor; said battery pack electrically connecting to said electric motor to provide electric power to said electric motor; and
   b) a power transmission mechanism for coupling between said pedal drive mechanism and said chain; said power transmission mechanism further comprising a first unidirectional power transmission module and a second unidirectional power transmission module, such that an auxiliary power transmitted by said power transmission mechanism from said power source to said chain is independent from a pedal power transmitted by said power transmission mechanism from said pedal drive mechanism to said chain;
   c) a sensor module for sensing a pedal strength and a pedal speed on said pedal driving mechanism; and
   d) a controller connected to said sensor module and said power source; said controller receiving a data representing said pedal strength and said pedal speed from said sensor module and sending a command to said power source to control an operation of said power source.

6. The motorized driving device of claim 5, wherein said sensor module further comprises a speed sensor and a torque sensor to measure said pedal speed and said pedal strength respectively.

7. The motorized driving device of claim 6, wherein said first unidirectional power transmission module further comprises an active flange for coupling to said pedal drive mechanism, and said second unidirectional power transmission module further comprises a passive flange coupled to said power source; said active flange providing said pedal power from said pedal drive mechanism to said chain; said passive flange providing said auxiliary power from said power source to said chain; said sensor module further comprising:
   a) a push plate centrally fixed onto a crank shaft which is capable of fitting into said pedal driving mechanism; said push plate arranged to be perpendicular to an axial direction of said crank shaft;
   b) a shift lever with its one end connecting to an outer circumference of said push plate;
   c) at least one spring toroidally arranged between said active flange and said passive flange;
      wherein when said active flange rotates due to said pedal power, said at least one spring compressed; an angular displacement of said active flange with respect to said passive flange driving said shift lever to rotate which in turn pushing push plate to move in said axial direction.

8. The motorized driving device of claim 7, wherein said speed sensor further comprises a magnet and a Hall effect sensor; said magnet fixed on said push plate such that when said push plate rotates due to the rotation of said crank shaft, said magnet also rotating to incur a variation of a magnetic field generating by said magnet; said Hall effect sensor detecting said variation of said magnetic field as an indication of said pedal speed.

9. The motorized driving device of claim 7, wherein said torque sensor further comprises a magnet and a Hall effect sensor; said magnet fixed on said push plate such that when said push plate is pushed in said axial direction by said shift lever, said magnet moves to incur a variation of a magnetic field generating by said magnet; said Hall effect sensor detecting said variation of said magnetic field as an indication of said pedal strength.

10. The motorized driving device of claim 9, wherein said magnet is a ring-shaped magnet.

11. The motorized driving device of claim 6, wherein said power transmission mechanism further comprises a crank shaft which is capable of fitting into said pedal driving mechanism; said torque sensor further comprising:
a) a magneto-elastic ring centrally fixed on said crank shaft;
b) a Hall effect sensor; said Hall effect sensor capable of detecting a magnetic field generated by said magneto-elastic ring when said magneto-elastic ring is rotating as driven by said crank shaft; said magnetic field indicating said pedal strength.

12. The motorized driving device of claim 11, wherein said magneto-elastic ring is made of titanium-nickel material.

13. A motorized driving device for mounting to a frame of a bicycle, said bicycle comprising a pedal drive mechanism coupled to a chain for transferring a drive force to at least one chainwheel, said motorized driving comprising:
a) a power source of rotary power, said power source further comprising:
   i) a battery pack; and
   ii) an electric motor coupled to said power transmission mechanism; said battery pack detachably fixed to said electric motor; said battery pack electrically connecting to said electric motor to provide electric power to said electric motor; and
b) a power transmission mechanism for coupling between said pedal drive mechanism and said chain; said power transmission mechanism further comprising a first unidirectional power transmission module and a second unidirectional power transmission module, such that an auxiliary power transmitted by said power transmission mechanism from said power source to said chain is independent from a pedal power transmitted by said power transmission mechanism from said pedal drive mechanism to said chain; and
c) a two-stage gear reduction module coupled between said power source and said power transmission mechanism wherein said gear reduction module further comprises: a casing; a planet gear reduction stage contained in said casing; said planet gear reduction stage connecting to said power source; a cylindrical gear reduction stage contained in said casing, said cylindrical gear reduction stage connecting to said planet gear reduction stage and coupled to said power transmission mechanism, wherein said rotary power from said power source is received by said planet gear reduction stage and outputted to said cylindrical gear reduction stage, said cylindrical gear reduction stage outputting said auxiliary power with reduced speed and increased torque compared to said rotary-power from said power source; said motorized driving device further comprising a crank shaft which is capable of fitting into said pedal driving mechanism; said gear reduction module capable of reducing a speed of said rotary power outputted by said power source and increase a torque thereof.

14. The motorized driving device of claim 13, wherein said battery pack is fixed onto a battery fixing plate.

15. The motorized driving device of claim 14, wherein said battery fixing plate is fixed onto said frame of said bicycle.

16. The motorized driving device of claim 14, wherein said battery fixing plate is fixed onto a casing of said power transmission mechanism.

17. The motorized driving device of claim 13, wherein a body of said motorized driving device further comprises an inner sleeve, said inner sleeve having a predetermined diameter for inserting into a standardized bottom bracket.

18. A method of installing a motorized driving device to a bicycle, said bicycle comprising a frame, a bottom bracket located at the bottom of said frame, a crank shaft rotatably hinged in said bottom bracket, a bicycle sprocket fixed to said crank shaft and on which a chain rests, and two crank arms fixed to said crank shaft; said method comprising the steps of:
a) removing said crank shaft, said crank arms and said bicycle sprocket from said bicycle;
b) fixing a body of said motorized driving device to said frame of said bicycle, said motorized driving device comprising a battery pack and an electric motor coupled to said power transmission mechanism; said battery pack electrically connecting to said electric motor to provide electric power to said electric motor; wherein said fixing step further comprises the steps of:
   i) inserting an inner sleeve of said motorized driving device into said bottom bracket; a device shaft rotatably received in said inner sleeve; said device shaft connecting to said body of said motorized driving device;
   ii) tightening a screw cap on a protruding end of said inner sleeve to fix said inner sleeve to said bottom bracket;
   iii) positioning a screw protruding from said body between two forks of a chain stay of said frame of said bicycle;
   iv) placing a holding plate on said chain stay such that said chain stay placed between said body of said motorized driving device and said holding plate; said screw penetrating said holding plate; and
   v) tightening a first nut on said screw to fix said holding plate to said screw, whereby said body of said motorized driving device mounted on said frame of said bicycle; and
c) connecting said chain to said body of motorized driving device.

19. The method of claim 18, further comprising a step of re-installing said crank arms, said re-installing step comprising the steps of:
a) positioning one said crank arm to have one end of said device shaft passing through a perforation formed on one end of said crank arm; and
b) fixing said crank arm to said device shaft by using a second nut.

20. The method of claim 18, wherein said body of said motorized driving device further comprises a chain cover detachably attached to said body, a device sprocket received in said chain cover, said connecting step further comprises the steps of:
a) detaching said chain cover from said body of said motorized driving device;
b) mounting a portion of said chain of said bicycle on said device sprocket;
c) reattaching said chain cover to said body of said motorized driving device.

21. A motorized driving device for mounting on a bicycle, said bicycle comprising a frame and a bottom bracket located at the bottom of said frame, said motorized driving device comprising:
a) a body; and
b) an inner sleeve connected to said body; said inner sleeve capable of inserting into said bottom bracket, such that said body of said motorized driving device is secured to said frame of said bicycle;
c) a battery pack;
d) an electric motor coupled to said power transmission mechanism; said battery pack detachably fixed to said electric motor; said battery pack electrically connecting to said electric motor to provide electric power to said electric motor;

e) a first fastening means; said inner sleeve capable of fixing to said bottom bracket by said first fastening means; said first fastening means further comprising a screw cap; said inner sleeve capable of fixing to said bottom bracket by tightening said screw cap on a protruding end of said inner sleeve to fix said inner sleeve to said bottom bracket.

22. The motorized driving device of claim 21 further comprises a second fastening means which comprises:
 a) a first nut;
 b) a screw protruding from said body of said motorized driving device; said screw adapted to fit into said first nut;
 c) a holding plate having a perforation, said perforation allowing said screw to pass therethrough;
 wherein said body of said motorized driving device capable of mounting on said frame of said bicycle by positioning said screw between two forks of a chain stay of said frame of said bicycle and then fixing said screw to said chain stay by said holding plate and said first nut.

23. The motorized driving device of claim 21, wherein said body further comprising:
 a) an electric motor;
 b) an shaft connected to said electric motor for outputting a drive power from said electric motor; and
 c) a sprocket coupled to said shaft and rotatable with said shaft; said sprocket further capable of mounting a portion of a chain of said bicycle thereon, such that said drive power from said shaft drives said chain to move.

24. A light vehicle having a motorized driving device according to claim 21.

\* \* \* \* \*